3,123,581
PROCESSING ISOOLEFIN-DIOLEFIN RUBBERY
COPOLYMERS WITH KAOLIN CLAYS
Stanley R. Shuart, Colonia, and Albert M. Gessler and Roger S. Hawley, Cranford, N.J., assignors to Esso Research and Engineering Company, a corporation of Delaware
No Drawing. Filed May 31, 1957, Ser. No. 662,588
5 Claims. (Cl. 260—41.5)

The present invention relates to isoolefin-diolefin rubbery copolymers having improved processing properties. More specifically, it concerns heat treating butyl rubber in the presence of kaolin clays to enhance their processing properties and to increase their usefulness.

It has been found that hard kaolin clays regulate the properties of butyl rubber and thereby improve its processibility. This is achieved by compounding them with butyl rubber and heating the combination to a temperature of 250° F. or higher. It has also been discovered that under certain conditions the butyl rubber may be converted into a pliable, putty-like form.

Butyl rubber is a copolymer of a major proportion of an olefin such as relatively low molecular weight isoolefin (e.g. isobutylene) and a minor proportion of a multi-olefin, preferably having a ratio of the isoolefin to the multi-olefin of about 90–99.5% to about 10–0.5% respectively. Copolymers of the above general type, especially where the copolymer is above about 85% (and especially above about 90%) to about 99.5% of a $C_4$–$C_7$ isoolefin such as isobutylene with about 15–0.5% (preferably about 10–0.5%) of a multiolefin of about 4–14 carbon atoms are commonly referred to in patents and literature as "butyl rubber" or GR–I rubber (Government Rubber—Isobutylene) and, for example, is referred to as "butyl rubber" in patents and in textbook "Synthetic Rubber," by G. S. Whitby, 1954 edition, pages 608–609, etc. The preparation of butyl-type rubbers is described in U.S. Patent 2,356,128 to Thomas et al. and also in other patents as well as in literature. In general the synthetic rubber comprises a copolymer of isobutylene and a multiolefin such as isoprene, butadiene, dimethyl butadiene, myrcene, piperylene, etc. The copolymer of isobutylene and isoprene is preferred.

Usually the copolymer has a Staudinger molecular weight within the range between about 20,000 and 100,000. The iodine number (Wijs) is in the range from about 0.5 to 50, preferably in the range from about 1 to 20. The above copolymer when cured has good elasticity, tensile strength, abrasion resistance and flexure resistance.

According to the present invention butyl rubber is mixed with a hard uncalcined kaolin (china) clay of the type described by Gongrower in "India Rubber World," 118, 793–795 (1948), and heated to a temperature above 250° F., but not higher than about 440° F. until the Mooney viscosity of the compounded butyl decreases to the desired degree. Fillers such as carbon black or clay may be present during the heat treatment or reaction. Depending upon the amount of kaolin clay employed, the properties of the rubbery product will vary between those of a synthetic rubber having high tensile strength and other physical properties, and that of a soft, pliable, putty-like clay. The effect produced by the butyl rubber-kaolin heat treatment is most unusual since fillers serve to reenforce butyl rather than lower its Mooney viscosity. The amount of kaolin clay employed may vary between 1 and 200 parts by weight per 100 parts by weight (phr.) of butyl rubber. Generally between 1 and 25 phr. of the kaolin clay will be sufficient to improve the processibility of the butyl rubber. On the other hand, its physical properties may be drastically altered by using about 75 to 200 phr. of the hard kaolin clay.

Clay may be defined as a disperse system of mineral fragments of aluminum silicate which is plastic when wet and hard when fired. Kaolin is a corruption of the Chinese word "Kauling" which is interpreted to mean a ridge or hill. Kaolin clays are generally classified as being hard or soft depending upon whether they produce a rubber compound having high modulus, etc. A soft clay produces a rubber having a lower modulus, tensile strength and resistance to abrasion. Kaolin clay or kaolinite has the following general formula:

$$Al_2O_3 \cdot 2SiO_2 \cdot 2H_2O$$

A chemical analysis of typical Georgia or South Carolina kaolin clays revealed that the $Al_2O_3$ content may vary between 38 and 40 wt. percent and the $SiO_2$ content is between 44 and 47 wt. percent. Pure uncalcined kaolinite contains 39.50 wt. percent aluminum trioxide and 46.54 wt. percent silicon dioxide. The clays have a specific gravity of about 2.60 and a particle size such that at least 80% of the clay is 2 microns or less. An aqueous slurry of these clays may have a pH between 4.5 and 7.0; however, it is usually between pH 4.5 and 5.5. It is believed that the particle size distribution, rather than the chemical composition of geological location of these clays, is the most important property in distinguishing between hard and soft clays, though probably the size distribution, chemical composition and perhaps also the combined moisture content, all interact to produce the results obtained. Among the commercially available clays which have been found suitable for the purposes of the present invention are Suprex sold by J. M. Huber Corp., Champion clay sold by Harwick Standard Chemical Co. and Crown clay sold by Southeastern Clay Co.

When it is desired to improve the processibility and the physical properties of butyl rubber, the butyl rubber-kaolin clay heat treatment should be carried out in the presence of a filler and about 0.1 to 2 phr. of a nitroso or quinone heat-interaction promoter. Promoters which have been successfully used in this manner include para-dinitrosobenzene, metadinitrosobenzene, N - nitroso - N-methyl-para-nitrosoaniline, various quinonedioximes, e.g., p-quinone dioxime and their derivatives such as quinone-dioximedibenzoate.

According to one embodiment of the invention, a small amount of hard kaolin clay, preferably about 1–10 phr., is blended with high molecular weight butyl rubber and about 1–150 phr. of a channel black, furnace black, or other clay and heat treated at a temperature between 250 and 440° F. It has been noted that the kaolin clay improves the processibility of the otherwise difficult to process high molecular weight butyl rubber. For instance, when butyl rubber having a Staudinger molecular weight between about 45,000 and 90,000 is extruded from a Garvey die (Industrial and Engineering Chemistry, 34, 1309 (1942) at 220° F., using an 80 r.p.m. screw speed, the extruded rubber is generally rated "rough." By employing small amounts of hard kaolin clay it is possible to obtain very smooth extrusions of these high molecular weight butyl rubbers. Smooth extrusions of high molecular weight butyl were heretofore difficult to produce.

In another embodiment, butyl rubber of any molecular weight is blended with large amounts of hard kaolin clay, preferably about 15 to 150 phr., and heat treated at temperatures above 250° F. The heat treatment may be carried out in various ways depending upon the available equipment and time. In general, the time may range from 1 minute to 8 hrs., the higher temperatures requiring less time. The rubber compound may be mixed on a hot mill or in a Banbury mixer. The resultant mixture may have a Mooney viscosity at 212° F. as low as 1 or as high as 100, according to the compounding and the conditions employed. Preferably, the compounded butyl rubber recovered has a Mooney viscosity at 212° F. of between 2 and 60. Thus by heat treating butyl with an uncalcined hard kaolin clay it is possible to lower its Mooney viscosity at 212° F. by, say, 5 to 50 units, depending on the conditions employed.

It has been found that the physical properties of the rubber may be controlled by using thiourea and quinone stabilizers such as dibutyl thiourea and hydroquinone. The amount of organic stabilizer employed will depend upon the properties desired. However, for most purposes about 1 to 5 parts by weight of stabilizer for each 100 parts by weight butyl rubber (phr.) will be sufficient to regulate the properties of the butyl rubber.

The heat treated rubbery polymer may be cured with sulfur, sulfur-containing compounds, or quinone compounds. For example, the cure may be accomplished in the presence of such compositions as (1) zinc oxide and sulfur, (2) zinc oxide and tetramethyl thiuram disulfide, (3) dialkyl polythiocarbamates, (4) lead oxide and para-quinone dioxime with or without sulfur, (5) para-quinone dioxime dibenzoate, lead oxide and sulfur, etc. For vulcanization purposes the butyl rubber polymer may be compounded as follows:

| Component | General Range, phr. | Preferred Range, phr. |
|---|---|---|
| Metal Oxide (e.g. zinc oxide) | 1–50 | 2–30 |
| Mold Release Agent (e.g. stearic acid) | 0–5 | 0–2 |
| Curing Agent | 0–10 | 0–5 |
| Accelerator | 0–5 | 0–2 |
| Anti-oxidant (e.g. N-lauroyl para-amino phenol) | 0–5 | 0–2 |

Prior to curing the butyl rubber, various fillers and plasticizers may be compounded with it. The preferred plasticizers are naphthenic or paraffinic hydrocarbon oils having an SSU viscosity at 100° F. of between 90 and 1300.

The butyl rubber compositions prepared according to the present invention may be used as caulking compositions, adhesives, insulators, tire linings, window channels, and in tire treads.

The following examples are given so that the present invention will be better understood.

EXAMPLE 1

An isobutylene-isoprene butyl rubber (GR-I-50) having a Mooney viscosity at 212° F., after 8 minutes, between 41 and 49 and a mole percent unsaturation of between 1.0 and 1.4, was blended in a Banbury mixer for 5 minutes at various temperatures, with a hard uncalcined kaolin clay (Suprex) having a specific gravity of 2.60, a particle size of about 2 microns and containing 37.94 wt. percent aluminum trioxide and 44.90 wt. percent silicon dioxide.

Table I

| | | |
|---|---|---|
| GR-I-50 | 100.00 | 100.00 |
| Kaolin Clay | 150.00 | 150.00 |
| Stearic Acid | 3.00 | 3.00 |
| Temperature of Mix, °F. | 80 | 305 |
| Mooney Viscosity at 212° F. | 114 | 2.5 |

The above data show that when butyl rubber is heat treated in the presence of a hard kaolin clay the Mooney viscosity at 212° F. drops to as low as 2.5. The polymer had a putty-like appearance which made it suitable for use as a caulking or adhesive agent.

EXAMPLE 2

Isobutylene-isoprene butyl rubber (GR-I-50) was mixed in a Banbury mixer with varying amounts of the same kaolin clay used in Example 1 at the indicated temperature for 3 minutes. The effect of the clay on the rubber's Mooney viscosity at 212° F. is shown below.

Table II

| Run # | Parts of Clay/100 Parts Rubber | Mixing Temp., °F. | Mooney Viscosity |
|---|---|---|---|
| 1 | 75 | 75 | 53.5 |
| 2 | 75 | 150 | 50.5 |
| 3 | 75 | 300 | 42 |
| 4 | 30 | 300 | 36 |
| 5 | 15 | 300 | 35 |

The data show that at 300° F. small quantities of hard kaolin clay markedly reduce the Mooney viscosity of butyl rubber.

When these compositions were cured with 2 phr. of sulfur, 1 phr. of tetramethyl thiuram disulfide and 5 phr. of zinc oxide for 40 minutes at 320° F. they had the following physical properties.

Table III

| Run # | 1 | 2 | 3 | 4 | 5 |
|---|---|---|---|---|---|
| Tensile, p.s.i. | 2,200 | 2,275 | 1,970 | 2,348 | 1,850 |
| 300% Modulus | 150 | 150 | 150 | 150 | 150 |
| Elongation | 830 | 850 | 880 | 795 | 720 |

The data show that by this method it is possible to substantially reduce the rubber's Mooney viscosity without significantly affecting its other physical properties.

EXAMPLE 3

Several experiments were carried out to demonstrate the effect of stabilizers on the action of the kaolin clays. Example 1 was repeated with the exception that stabilizers were added to the rubber mix prior to the heat treatment step.

Table IV

| | | | |
|---|---|---|---|
| GR-I-50 | 100.00 | 100.00 | 100.00 |
| Kaolin Clay | 150.00 | 150.00 | 150.00 |
| Stearic Acid | 3.00 | 3.00 | 3.00 |
| Dibutylthiourea | 3.00 | | |
| Hydroquinone | | 3.00 | |
| Temperature of Mix, °F. | 325 | 330 | 305 |
| Mooney Viscosity at 212° F. | 57.5 | 24 | 2.5 |

The results show that dibutylthiourea and hydroquinone prevent the kaolin clay from reducing the butyl rubber to a putty-like mass. When the former stabilizer was used, the Mooney viscosity was in a very desirable range. Thus, by employing various amounts of these stabilizers, the viscosity of butyl rubber is easily adjusted to between 20 and 60 at 212° F. The stabilizer prevents the butyl from depolymerizing to too low a value.

EXAMPLE 4

A number of experiments was carried out to determine the effect of adding relatively small amounts of an uncalcined hard kaolin clay to a butyl rubber having a Staudinger molecular weight of 85,000 and containing 50 phr. of a high abrasion furnace black. The kaolin clay had a specific gravity of 2.6, an aluminum trioxide content of 37.9 wt. percent, a silicon dioxide of 44.9 wt. percent, and a particle size of about 2 microns.

1500 parts by weight of the isobutylene-isoprene butyl rubber having a mole percent unsaturation of 1.5 to 2 was compounded with 525 parts by weight of an HAF black and varying amounts of the hard kaolin clay in a Banbury mixer. After mixing for about 5 minutes another 600 parts of the same butyl rubber was added and the total mixture was mixed for an additional 3 min. at varying temperatures. The mix was then dumped on a cold mill. 0.5 phr. stearic acid was added with the HAF black in the Banbury. 100 parts by weight of the heat treated isobutylene-isoprene butyl rubber was compounded with 5 parts of zinc oxide, 2 parts of sulfur, 1 part of benzothiazyl disulfide, 1 part of tetramethyl thiuram disulfide and 5 parts of a naphthenic hydrocarbon oil having an SSU viscosity of 508 at 100° F. and 58 at 210° F. and a flash point of 445° F. The resulting blend was cured for 45 min. at 307° F. Before vulcanizing the butyl rubber it was extruded through a Garvey die at 220° F. with an 80 r.p.m. screw speed. The extrusion data obtained with heat treated butyl, before and after compounding, as well as the physical properties of the vulcanizates are shown in Table V.

*Table V*

| Suprex Clay (phr.) | Max. Temp. During Banbury Mixing, °F. | Mooney Viscosity @ 212° F. | Extrusion Through Garvey Die Rating [1] at 220° F. (80 r.p.m. Screw Speed) | | Physical Properties of Vulcanizates (Cured 45 Mins. at 307° F.) | | |
|---|---|---|---|---|---|---|---|
| | | | Before Compounding | After Compounding | Tensile (p.s.i.) | 300% Modulus (p.s.i.) | Elongation (percent) |
| 0 | 400 | 114 | Fairly Rough #5 | Sl. Rough #4 | 2,660 | 1,420 | 530 |
| 5.0 | 430 | 101 | Fairly Rough #4½ | Fairly Smooth #3 | 2,750 | 1,300 | 580 |
| 6.0 | 430 | 98 | Fairly Smooth #3 | Very Smooth #1 | 2,700 | 1,160 | 605 |
| 6.0 | 390 | 99 | Fairly Rough #4½ | Smooth #1½ | 2,800 | 1,210 | 590 |
| 7.5 | 435 | 89 | Very Smooth #1 | Very Smooth #1 | 2,550 | 1,055 | 615 |
| 10.0 | 440 | 79 | do | do | 2,330 | 1,010 | 610 |

[1] Garvey die ratings: 1—very smooth; 2—smooth; 3—fairly smooth; 4—slightly rough; 5—fairly rough; 6—rough; 7—very rough; 8—extremely rough.

The data show that small amounts of hard kaolin clay greatly improve the appearance of extruded high molecular weight butyl rubber without having any deleterious effect on the physical properties of the vulcanizates.

EXAMPLE 5

Example 4 was repeated with the exception that an SAF carbon black was used. The results obtained when varying amounts of the uncalcined kaolin clay were added to the rubber compound in a Banbury mixer are set forth in Table VI below:

*Table VI*

| Suprex Clay (phr.) | Max. Temp. During Banbury Mixing, °F. | Mooney Viscosity at 212° F. | Extrusion Through Garvey Die Rating at 220° F. (80 r.p.m. Screw Speed) | | Physical Properties of Vulcanizates (Cured 45 Mins. at 307° F.) | | |
|---|---|---|---|---|---|---|---|
| | | | Before Compounding | After Compounding | Tensile (p.s.i.) | 300% Modulus (p.s.i.) | Elongation (percent) |
| 5.0 | 380 | 123 | Extremely Rough #8 | Fairly Rough #5 | 3,280 | 1,150 | 600 |
| 6.0 | 440 | 89 | Smooth #2 | V. Smooth #1 | 2,920 | 815 | 690 |
| 7.5 | 430 | 70 | V. Smooth #1 | do | 2,280 | 650 | 610 |
| 10.0 | 400 | 50 | do | do | 1,720 | 360 | 760 |

The data in the table show that when 6 to 7.5 parts by weight of kaolin clay per 100 parts by weight (phr.) butyl rubber is added to the rubber mix at higher temperatures, the extruded rubber is very smooth and has outstanding physical properties. The amount of kaolin clay used is more critical when SAF black is used, as opposed to HAF black, because more heat is generated in the case of the former.

Resort may be had to various modifications and variations of the present invention without departing from the spirit of the discovery or the scope of the appended claims.

What is claimed is:

1. A process for improving the properties of compounded isoolefin-multiolefin butyl rubber copolymer-containing compositions which comprises compounding about 100 parts by weight of said copolymer with about 15 to 150 parts by weight of a carbon black and about 1 to 200 parts by weight of hard, uncalcined, kaolin clay and heating the mixture formed at a temperature level of between about 250° and 400° F. for a time sufficient to decrease the Mooney viscosity at 212° F. by about 5 to 50 units.

2. A process for improving the processibility of an isoolefin-multiolefin butyl rubber copolymer having a Mooney viscosity above about 100 after 8 minutes at 212° F. which comprises compounding about 100 parts by weight of said copolymer with about 1 to 200 parts by weight of hard, uncalcined, kaolin clay and about 1 to 5 parts by weight of an organic stabilizer selected from the group consisting of dibutyl thiourea and hydroquinone and heating the compounded copolymer-containing composition formed at a temperature level of between about 250° and 440° F. until the copolymer has a Mooney viscosity of between about 20 and 60.

3. A process according to claim 2 in which there is the additional step of vulcanizing the heated, compounded copolymer in the presence of an added curative.

4. A process for improving the processibility of compounded isoolefin-multiolefin butyl rubber copolymers having Staudinger molecular weights of about 45,000 to 90,000 in which the copolymer is compounded with carbon black, which comprises compounding about 100 parts by weight of said copolymer with about 25 to 150 parts by weight of said carbon black and about 1 to 25 parts by weight of hard, uncalcined, kaolin clay and heating the mixture formed at a temperature level of between about 250° and 440° F. for about 1 minute to 8 hours so that the Garvey die extrusion rating of the compounded copolymer-containing composition is very smooth to smooth.

5. A process according to claim 4 followed by vulcanization with a sulfur-containing curative.

References Cited in the file of this patent

UNITED STATES PATENTS 2,702,286     Iknayan et al.     Feb. 15, 1955

OTHER REFERENCES

Davis et al.: The Chemistry and Technology of Rubber, Reinhold Publishing Corp., New York, N.Y., 1937, pages 428, 429, 434, 757 and 758 relied upon.

Barron: Modern Synthetic Rubbers, 3rd edition, Chapman & Hall, Ltd., London, 1949, pages 254–255 and 258–260.